United States Patent [19]

Sethi

[11] E Re. 31,573

[45] Reissued May 1, 1984

[54] FILM CARTRIDGE ASSEMBLY WITH PRESSURE PLATE

[75] Inventor: Gurdip S. Sethi, Rochester, N.Y.

[73] Assignee: Eastman Kodak Company, Rochester, N.Y.

[21] Appl. No.: 497,220

[22] Filed: May 27, 1983

Related U.S. Patent Documents

Reissue of:

[64] Patent No.: 4,309,096
Issued: Jan. 5, 1982
Appl. No.: 161,792
Filed: Jun. 23, 1980

U.S. Applications:

[63] Continuation of Ser. No. 372,851, Apr. 28, 1982, abandoned, and a continuation-in-part of Ser. No. 106,630, Dec. 26, 1979, abandoned.

[51] Int. Cl.[3] ..... G03B 1/48

[52] U.S. Cl. ..... 354/121; 354/203; 354/275

[58] Field of Search ..... 354/121, 174, 178–182, 354/203, 275; 352/75, 76, 102, 103; 242/71.1, 71.2

[56] References Cited

U.S. PATENT DOCUMENTS

| | | | |
|---|---|---|---|
| 1,709,782 | 4/1929 | Denniss et al. | 354/203 |
| 3,347,142 | 10/1967 | Steisslinger | 354/275 |
| 3,943,535 | 3/1976 | Asano | 354/174 |
| 4,202,614 | 5/1980 | Harvey | 354/121 |
| 4,290,676 | 9/1981 | Hozman et al. | 354/121 |

FOREIGN PATENT DOCUMENTS

| | | | |
|---|---|---|---|
| 1963779 | 2/1978 | Fed. Rep. of Germany | 354/174 |
| 2809856 | 9/1978 | Fed. Rep. of Germany | 354/121 |
| 334603 | 3/1904 | France | 354/203 |

*Primary Examiner*—John Gonzales
*Attorney, Agent, or Firm*—Milton S. Sales

[57] ABSTRACT

A photographic film cartridge assembly has front and rear opposed walls between which photographic film is movable to align image areas with an exposure window in the front wall. A film support surface is enterable into the cartridge assembly through the exposure window. An opening in the rear wall is aligned with the exposure window, and a pressure plate is retained on the rear wall for movement toward and away from the front wall. Baffle means on the pressure plate and the rear wall form a tortuous light path to prevent light entering the cartridge assembly through the opening from reaching the film.

13 Claims, 12 Drawing Figures

FILM CARTRIDGE ASSEMBLY WITH PRESSURE PLATE

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of application Ser. No. 106,630, filed Dec. 26, 1979, now abandoned. Reference is also made to commonly-assigned copending U.S. patent application Ser. No. 31,266 entitled PRESSURE MEMBER URGING MECHANISM filed in the names of N. D. Hozman, R. L. Reynolds, and T. G. Kirn on Apr. 18, 1979, now abandoned. *This is a continuation of application Ser. No. 372,851, filed Apr. 28, 1982, abandoned.*

BACKGROUND OF THE INVENTION

1. Field of the Invention

The present invention relates to film cartridge assemblies for use with cameras and, more specifically, to a film cartridge assembly including an improved pressure plate configuration for locating an exposure area of the film in an exposure plane.

2. Description of the Prior Art

It is commonplace to enclose photographic film in a cartridge, cassette, magazine, or the like, designed to afford convenient loading of a camera. Such enclosures typically have been configured to accommodate an elongated strip of roll film. It is also known to provide a plurality of exposure areas in a generally circular array on a disk-shaped sheet of film and to rotate such film disk incrementally to bring successive exposure areas into alignment with the camera's optical axis for exposure. An illustrative example of a film disk arrangement is shown in commonly-assigned U.S. Pat. No. 4,194,822 issued Mar. 25, 1980 to G. S. Sethi.

In the aforementioned patent, a film disk is mounted on a central core to form a film unit adapted to be rotatably supported within a protective casing for insertion into a camera. The protective casing is formed of a rigid material to protect the film from reasonably expected rough handling. An exposure window in the front wall of the casing provides access to the film for a camera's film support surface. The film is urged against the camera's film support surface by a spring biased pressure platen in the camera which acts through an opening in the rear wall of the casing. The opening is covered by an opaque flexible membrane to prevent light and dirt from entering the casing through the opening.

In order for the film to be held firmly against the camera's film support surface, the pressure platen in the camera should be accurately formed and have a high degree of flatness, and the flexible membrane should be exceedingly compliant to faithfully transmit the pressure platen's force and shape to the film to uniformly press the film against the camera's film support surface. Film cartridge assemblies in accordance with the present invention more reliably and accurately locate the film against the camera's film support surface by means of a rigid pressure plate retained by the rear wall of the cartridge. The pressure plate is movable relative to the rear wall to press the film firmly and uniformly against the camera's film support surface without a flexible membrane therebetween.

Although rigid pressure plates in cartridges are also known in the art, such as shown in German Offenlegungsschrift 2,809,856, light integrity of such known cartridges is maintained by interconnecting the rigid pressure plate and the cartridge rear wall by an annular opaque membrane which permits movement of the pressure platen relative to the cartridge walls. The use of a membrane is effective in light-sealing the cartridge opening, but requires a major amount of assembly operation during cartridge manufacture.

SUMMARY OF THE INVENTION

In accordance with the present invention, a photographic film cartridge assembly has front and rear opposed walls between which photographic film is movable to align image areas with an exposure window in the front wall. A camera film support surface is movable into the cartridge assembly through the exposure window. An opening in the rear wall is aligned with the exposure window, and a pressure plate is retained on the rear wall for movement toward and away from the front wall. Baffle means on the pressure plate and the rear wall form a tortuous light path to prevent light entering the cartridge assembly through the opening from reaching the film.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENT

Various terms such as "cartridge," "cassette," and "magazine" have been used to refer to film containers. Such a container, when loaded with film, is herein referred to as a "cartridge assembly." Because cartridges, cartridge assemblies, and photographic cameras for use therewith are well known, the present description is directed in particular to elements forming part of or cooperating more directly with cartridge assembly elements to which the present invention is specifically directed.

The present invention is an improvement of the cartridge assembly described in aforementioned U.S. Pat. No. 4,194,822. Any structure not shown herein may take the form shown in that application, and the disclosure of such application is hereby specifically incorporated into the present description. Apparatus that is not specifically shown or described herein or in the incorporated application is understood to be selectable from apparatus known in the art.

Figure 1:
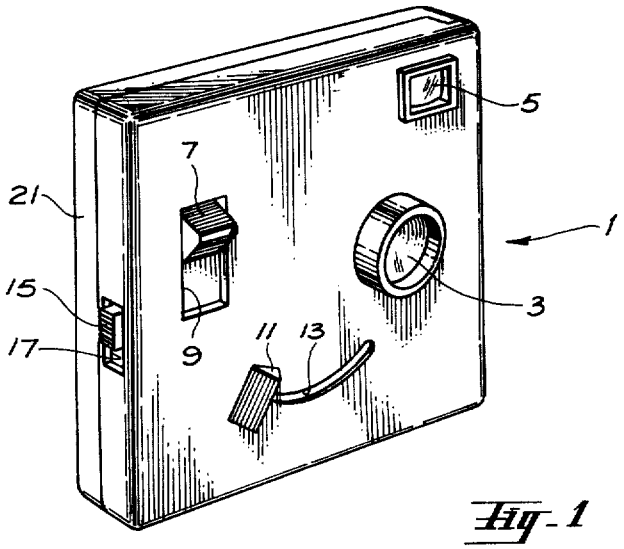
FIG. 1 is a front perspective view of a still picture camera which is suitable for use with a cartridge assembly in accordance with the present invention.
Figure 2:
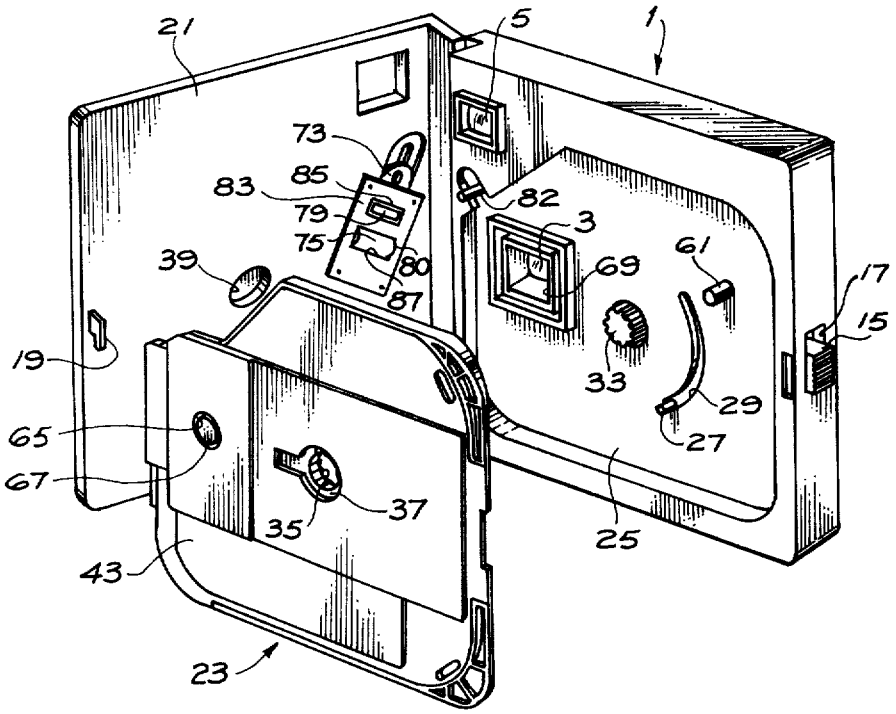
FIG. 2 is a rear perspective view of the still picture camera of FIG. 1 and of a film cartridge assembly in accordance with the present invention, showing the camera opened for receiving the cartridge assembly.

Referring now to the drawings and in particular to FIGS. 1 and 2, there is shown a still-picture camera 1 which is similar in certain respects to the camera disclosed in commonly-assigned copending U.S. patent application Ser. No. 31,266 entitled PRESSURE MEMBER URGING MECHANISM filed in the names of N. D. Hozman, R. L. Reynolds, and T. G. Kirn on Apr. 18, 1979. The camera front shown in FIG. 1 includes a picture-taking lens 3, a viewfinder 5, a shutter release button 7 movable along a slot 9, and a manual tab 11 movable along an arcuate slot 13. A locking tab 15 at one side of camera 1 is movable along a slot 17 to disengage from an internal latch 19 (FIG. 2) located on a rear door 21 of the camera, whereupon the rear door may be opened for loading a film cartridge assembly 23 into a receiving chamber 25 of the camera.

When cartridge assembly 23 is received in chamber 25, a pin 27, coupled to movable tab 11 and extending from an arcuate slot 29, engages film drive lugs 31 (FIG. 3) in the cartridge assembly. A splined rotatable post 33, projecting into the camera chamber 25, extends through an opening 35 in a central core 37 of the received cartridge assembly. When loading door 21 is closed, post 33 extends into a recess 39 in the door.

Figure 3:
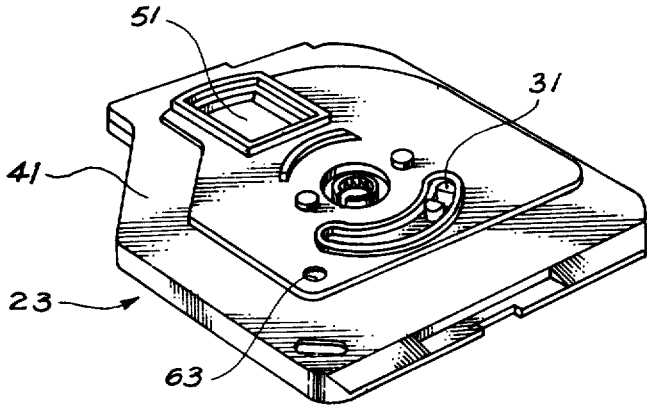
FIG. 3 is a front perspective view of the film cartridge assembly of FIG. 2.
Figure 4:
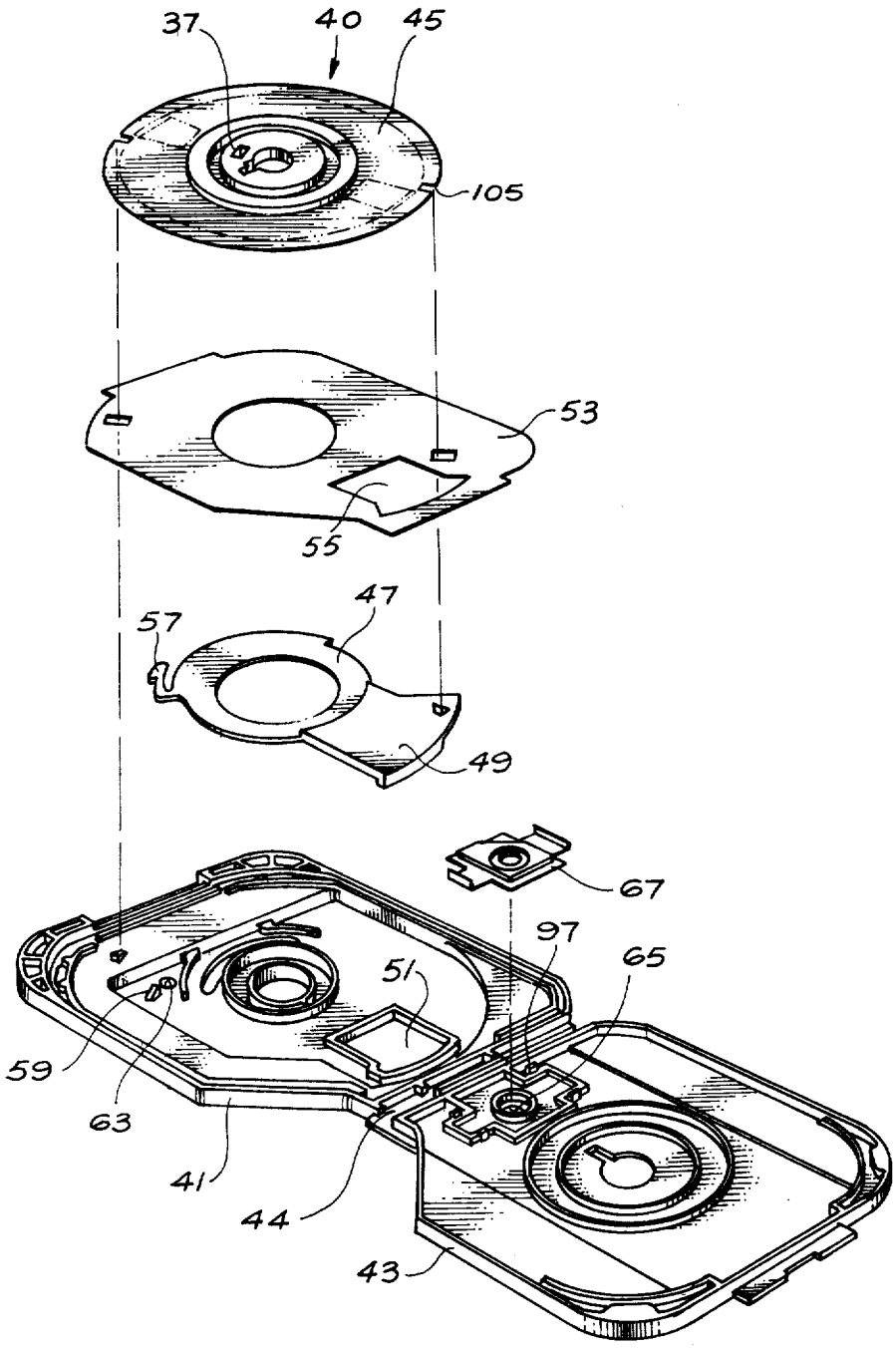
FIG. 4 is a view in exploded perspective of an open cartridge assembly according to FIGS. 2 and 3.

The cartridge assembly of FIGS. 2–4 includes front and rear opposed walls 41 and 43, respectively, joined together at one edge by a "living" hinge 44 (FIG. 4). The terms "front" and "rear" are used in this specification and appendant claims with reference to the orientation of the cartridge assembly during actual use of the apparatus described. That is, the front of the cartridge would face along the camera's optical axis in a direction toward the taking lens.

Disposed between opposed walls 41 and 43 is a film unit 40, which includes central core 37 and a film disk 45 similar to that described in the aforementioned U.S. patent and application. The film disk is illustrated in FIG. 4 as having a generally circular outer perimeter, but other non-circular (e.g., polygonal) film shapes may be visualized for use in accordance with the present invention. Accordingly, the term "disk" as herein used is intended to include non-circular as well as the illustrated circular configuration.

Film disk 45 comprises a moderately flexible but self-supporting base sheet formed of, for example, cellulose acetate or poly(ethylene terephthalate). The base sheet carries photosensitive elements on one face thereof, thus providing a photographic imaging surface on which a latent photographic image can be recorded and subsequently photographically developed.

An opaque cover member 47 is rotatably carried on front wall 41 so that its fan-shaped leaf portion 49 can be moved into and out of alignment with an exposure window 51 in that casing wall. The passage of light rays through exposure window 51 and onto photosensitive film disk 45 when the cartridge assembly is not protectively encased by a camera is precluded by means of leaf portion 49 and a separator layer 53. Separator layer 53 is formed of an opaque sheet material and has a framing window 55 aligned with exposure window 51 in casing wall 41.

Before the cartridge assembly is loaded into a camera, rotation of cover member 47 out of light blocking relationship with exposure window 51 and a separator layer window 55 is inhibited by an abutment 57 and a tooth 59. Rotation of film unit 40 is prevented at that time as explained in the aforementioned Sethi application.

When film cartridge assembly 23 is loaded into camera chamber 25, a pin 61 enters the cartridge assembly through an opening 63 to move abutment 57 from alignment with tooth 59. Now cover member 47 can be rotated by pin 27, and film unit 40 can be turned by incremental rotation of splined post 33. This moves successive exposure areas of film disk 45 across exposure window 51.

There is a possibility that, because of repeated or prolonged flexing of abutment 57, the abutment will take a set and not return to its locked position when the cartridge assembly is removed from a camera. In such an event, cover member 47 would be free to rotate, and ambient light could enter through exposure window 51, fogging at least a portion of film disk 45.

Figure 11:
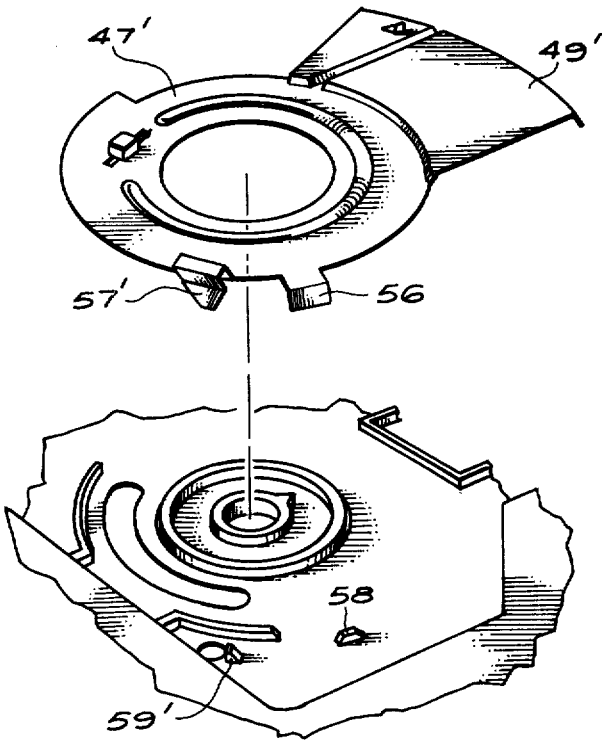
FIGS. 11 and 12 are detailed view of another embodiment of the locking device for cover member.
Figure 12:
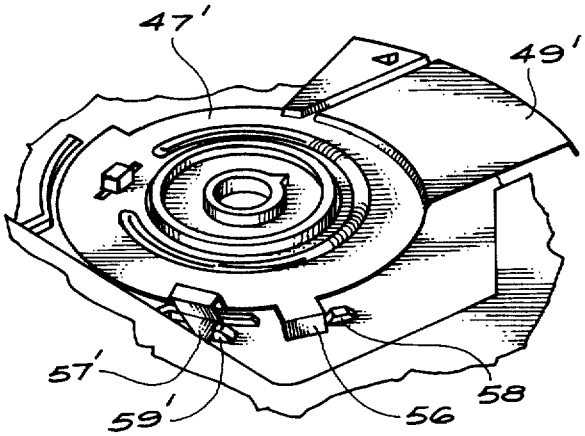

Although a malfunction is unlikely to occur, in FIGS. 11 and 12 provision has been made to substantially reduce even the slight chance of inadvertent opening of the cover member. In those figures, elements which are similar to, and function in the same manner as, elements in the first embodiment have been denoted with the same reference numerals with prime marks added.

A second, flexible abutment 56 and a ramped tooth 58 have been added to form a detenting function to inhibit opening to cover member 47′ even if the primary latch of abutment 57′ and tooth 59′ fail. The detent is not a lock and is overcome by a modest amount of torque on the cover member, but it provides sufficient restraint to reduce the chance of inadvertent opening movement of the cover member.

Figure 5:
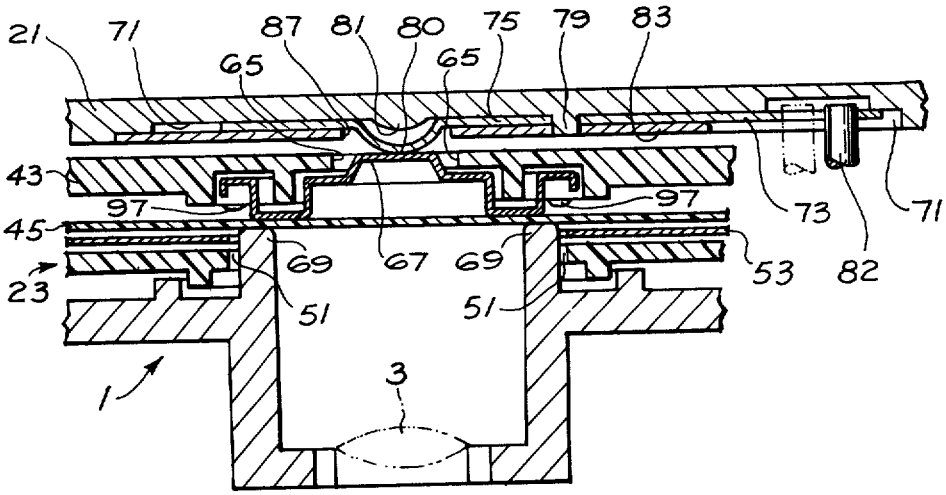
FIG. 5 is a sectional view of a portion of the cartridge assembly of FIGS. 2–4.

Rear wall 43 of cartridge assembly 23 has a circular opening 65, aligned with exposure window 51 (FIG. 5). An opaque, rigid pressure plate 67 is received in the rear wall behind film disk 45 and is movable toward and away from the front casing wall to selectively be brought to bear against the film disk. The pressure plate, in bearing against the rear surface of the film disk, presses the film disk into contact with a rectangular film support surface 69, projecting from the camera chamber 25 into exposure window 51. Through this interaction, an exposure area of film disk 45 is held substantially flat in an exposure plane coincident with the focal plane of picture-taking lens 3.

Figure 6:
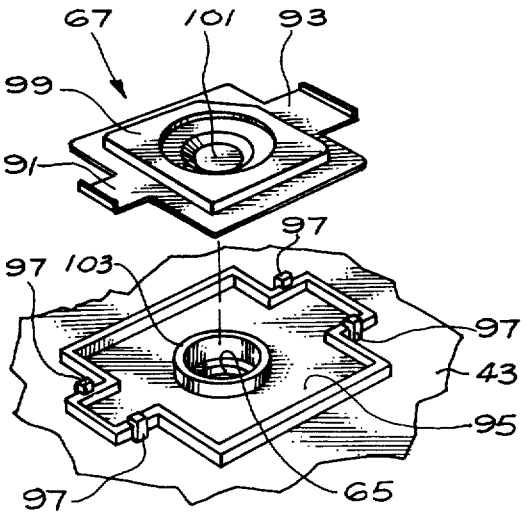
FIG. 6 is a detailed front perspective view of a portion of the cartridge assembly of FIGS. 2–5.
Figure 7:
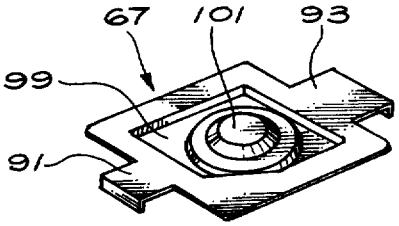
FIG. 7 is a back perspective view of the pressure plate shown in FIG. 6.

Pressure plate 67 and the adjacent surface of rear wall 43 are shown enlarged in FIG. 6 as they appear before assembly. The pressure plate preferably has a generally square configuration with a pair of oppositely extending legs 91 and 93. Rear wall 43 has a cavity 95 shaped to receive the pressure plate. The cavity may be a recess in the inner surface of the casing part of it may be formed by a raised rib as shown in FIG. 6.

Leg 91 has a dimension which is less than the corresponding dimension of leg 93. In the preferred embodiment, that dimension is the width of the leg. The mating portions of cavity 95 correspond to the different dimensions so that pressure plate 67 can be placed into the cavity in only one orientation during assembly.

A plurality of stake posts 97 are provided on rear wall 43 adjacent to the leg portions of cavity 95. After pressure plate 67 is inserted into the cavity, posts 97 are partially melted by high frequency vibratory energy to hold the pressure plate in the cavity. Alternatively, an inwardly projecting ridge could be provided around at least a portion of the periphery of cavity 95 so that pressure plate 67 would have a snap-fit in the cavity.

Pressure plate 67 has a raised surface 99 which is aligned with, and conforms generally to the shape of, rectangular film support surface 69 when the cartridge assembly is loaded into a camera. A center depression portion 101 extends into opening 65 in rear wall 43 so as to be presented to camera mechanism for urging the pressure plate against film disk 45.

An annular rib 103 extends into the cartridge assembly cavity around opening 65 so as to form, with pressure plate 67, a tortuous light path or baffle to prevent light entering the cartridge casing through opening 65 from reaching film disk 45 around the pressure plate. The rear surface of the pressure plate may be painted black so as to inhibit the reflection of such light.

One corner of raised surface 99 is recessed so that the camera's metering pawl may enter the cartridge assembly through exposure window 51 and engage film disk 45 in one of the disc's peripheral notches 105 (two of which are shown in FIG. 4) without contacting pressure plate 67 on the rear side of the film disc.

Figure 8:
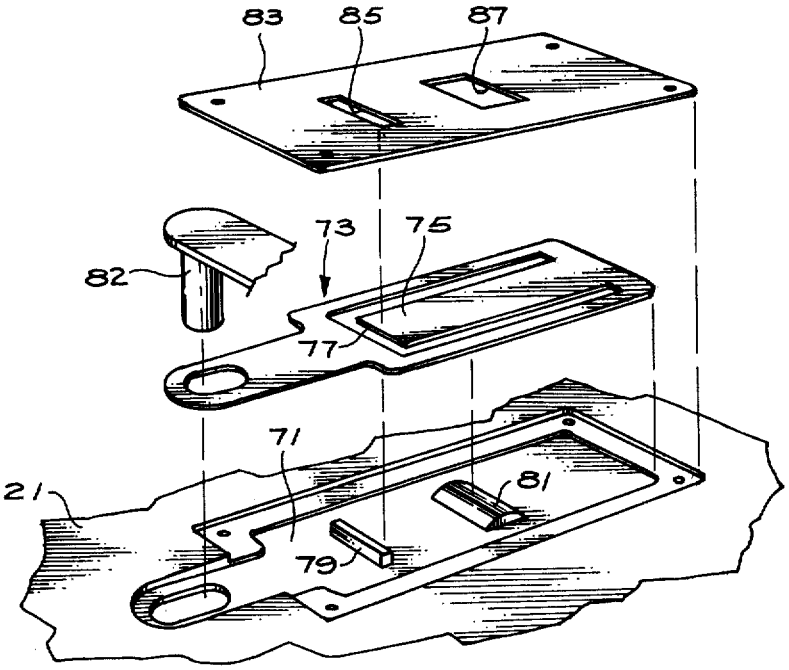
FIG. 8 is a view in exploded perspective of a portion of the camera of FIGS. 1 and 2.

One example of a mechanism for urging pressure plate 67 against the film disk is most clearly shown in FIGS. 5 and 8. Loading door 21 of camera 1 includes a recess or relieved area 71 which defines a storage plane for a pressure plate urging member 73. The pressure plate urging member is preferably a substantially flat strip of resiliently flexible material, such as Mylar, and includes a tongue 75. The tongue has a forward or leading end 77 which abuts to a stop 79, fixed to loading door 21 in recess 71. When pressure plate urging member 73 is moved generally to the left, in FIGS. 5 and 6 leading end 77 of tongue 75 is held stationary. This causes an intermediate portion 80 of the tongue to flex and bow out of the recess, as in FIG. 5. A slight hump 81 may be provided in recess 71 beneath the intermediate or bowed portion 80 to facilitate such bowing of tongue 75. When pressure plate urging member 73 is moved generally to the right, as viewed in FIG. 8 (to the left in FIG. 5), bowed portion 80 of tongue 75 substantially straightens, moving back into the storage plane defined by recess 71. Bowing of the tongue establishes a resilient or spring-like force in the bowed portion which may be used to return the pressure plate urging member generally to the right, in FIG. 6. An apparatus for moving the pressure plate urging member generally to the left is described in aforementioned U.S. patent application Ser. No. 31,266. Generally, an operating pin 82 controls the urging member's movement in accordance with the camera's shutter operation.

A constraining plate 83, having one opening 85 from which stop 81 protrudes and another opening 87 through which the bowed portion of tongue 75 protrudes, is secured to loading door 21, over pressure plate urging member 73. When the pressure plate urging member is moved generally to the left, as viewed in FIG. 8, constraining plate 83 maintains the pressure plate urging member in the storage plane, except for bowed portion 80 of tongue 75 which moves through opening 87 in the constraining plate, as in FIG. 5.

Figure 9:
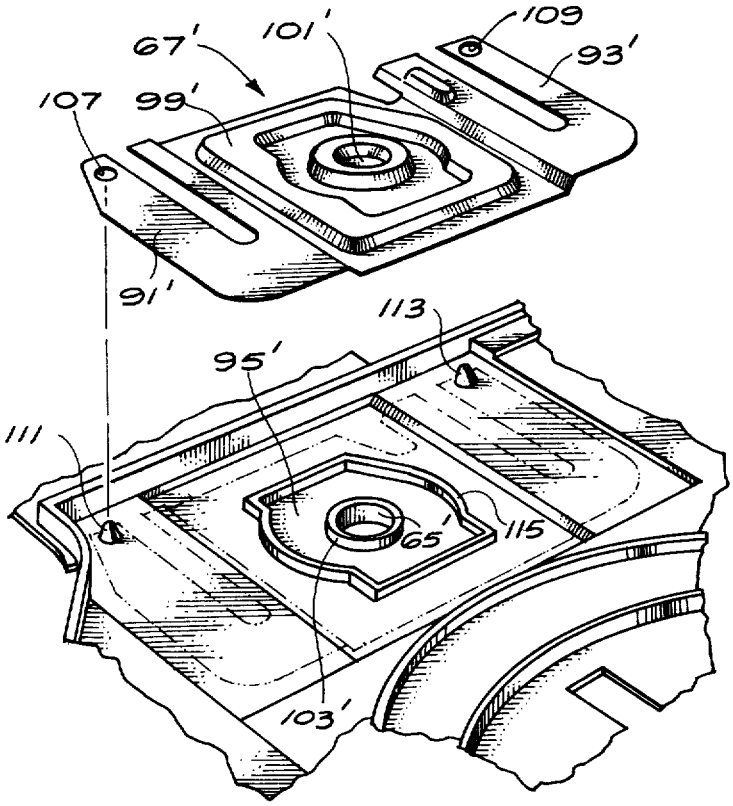
FIGS. 9 and 10 are detailed views of another embodiment of the pressure plate in accordance with the present invention in exploded and assembled form, respectively.
Figure 10:
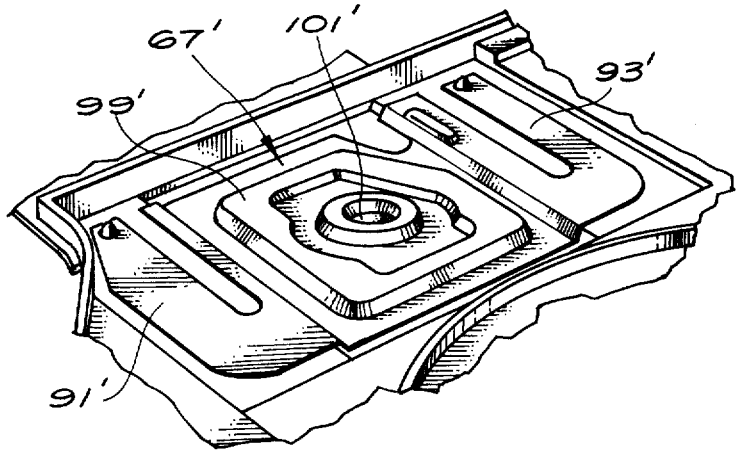

Referring to FIG. 5, bowed portion 80 of tongue 75 applies a resilient force to pressure plate 67 which is thereby moved against film disk 45 to press the film disk into contact with camera film support service 69, projecting into exposure window 51 of the film cartridge assembly. Whereupon, the pressed disk 45 is held substantially flat in the focal plane of picture-taking lens 3 for exposure FIGS. 9 and 10 show an alternative embodiment of the pressure plate, referred to by numeral 67′ and having a raised surface 99′ and a recessed central portion 101′ similar to those of the first embodiment pressure plate 67. A pair of flexible extending legs 91′ and 93′ have holes 107 and 109, respectively, which align with thermoplastic posts 111 and 113.

When the pressure plate is assembled into the cartridge casing as in FIG. 10, posts 111 and 113 are deformed, as by an ultrasonic horn, over the top of legs 91′ and 93′ to retain the plate. A rib 115 extends into the recess below raised surface 99′ to form a light-sealing tortuous path baffle.

This invention has been described in detail with particular reference to the preferred embodiment thereof, but it will be understood that variations and modifications can be effected within the spirit and scope of the invention.

I claim:

1. In a photographic film cartridge assembly having front and rear opposed walls between which film is movable [to align image areas with] *across* an exposure window in the front wall *to align image areas with the exposure window for exposure, the film remaining in said cartridge following such exposure,* and wherein the rear wall has an opening generally aligned with the exposure window through which the film's front surface can be pressed, by a force exerted against the rear surface of the film, against a film support surface of a camera in which the cartridge assembly is received to locate an image area in the camera's exposure plane; the improvement comprising:

a pressure plate;

means for retaining said pressure plate between the film and the rear wall in alignment with the exposure window and the opening *before and after exposure,* with a degree of freedom to permit movement of said pressure plate toward and away from the front wall, whereby a force is exerted against the rear surface of the film when said pressure plate is moved toward the front wall, *said retaining means comprising a pair of oppositely extending legs projecting from said pressure plate, one of said legs having a dimension which is less than the corresponding dimension of the other leg and discontinuity means of the rear wall of the cartridge assembly associated with said legs so as to inhibit orientation of said pressure plate relative to the rear wall in all but the proper orientation*; and baffle means on said pressure plate and the rear wall for forming a tortuous light path to prevent light which enters said cartridge assembly through the opening from reaching the film *before and after exposure.*

[2. The improvement as defined in claim 1 wherein said pressure plate includes a portion which extends into the opening in the rear wall so as to be engagable by a pressure plate urging member of a camera in which the cartridge assembly is received.]

[3. The improvement as defined in claim 1 wherein said pressure plate has a raised, generally rectangularly shaped surface facing the exposure window and positioned to be aligned with the film support surface of a camera in which the cartridge assembly has been received.]

[4. The improvement as defined in claim 1 wherein said pressure plate retaining means is on the rear wall.]

5. [The improvement as defined in claim 1 wherein] *In a photographic film cartridge assembly having front and rear opposed walls between which film is movable across an exposure window in the front wall to align image areas with the exposure window for exposure, the film remaining in said cartridge following such exposure, and wherein the rear wall has an opening generally aligned with the exposure window through which the film's front surface can be pressed, by a force exerted against the rear surface of the film, against a film support surface of a camera in which the cartridge assembly is received to locate an image area in the camera's exposure plane; the improvement comprising:*

*a pressure plate located between the rear wall and the film and substantially overlapping the opening in the rear wall;*

*means for retaining said pressure plate between the film and the rear wall in alignment with the exposure window and the opening before and after exposure, with a degree of freedom to permit movement of said pressure plate toward and away from the front wall, whereby a force is exerted against the rear surface of the film when said pressure plate is moved toward the front wall; and*

*baffle means on said pressure plate and the rear wall for forming a tortuous light path to prevent light which enters said cartridge assembly through the opening from reaching the film before and after exposure,* said baffle means [comprises:] *comprising (1)* a recess on the [side of said] pressure plate facing the rear wall of the cartridge assembly; [and] *(2)* a rib on the rear wall around the opening and extending into said recess, said recess and said rib surrounding the opening in the rear wall; *and (3) a raised rib on the rear wall surrounding said pressure plate.*

[6. The improvement as defined in claim 5 wherein said baffle means further comprises a raised rib on the rear wall surrounding said pressure plate.]

[7. The improvement as defined in claim 1 wherein said pressure plate retaining means comprises:

a pair of oppositely extending legs projecting from said pressure plate, one of said legs having a dimension which is less than the corresponding dimension of the other leg; and discontinuity means of the rear wall of the cartridge assembly associated with said legs so as to inhibit orientation of said pressure plate relative to the rear wall in all but the proper orientation.]

8. In a photographic film cartridge assembly having front and rear opposed walls between which film is movable to align image areas with an exposure window in the front wall, and wherein the rear wall has an opening generally aligned with the exposure window through which the film's front surface can be pressed, by a force exerted against the rear surface of the film, against a film support surface of a camera in which the cartridge assembly is received to locate an image area in the camera's exposure plane; the improvement comprising:

a pressure plate;

means, *including a pair of legs attached to said pressure plate and the rear wall,* for retaining said pressure plate between the film and the rear wall in alignment with the exposure window and the opening, with a degree of freedom to permit movement of said pressure plate toward and away from the front wall, whereby a force is exerted against the rear surface of the film when said pressure plate is moved toward the front wall; and cooperating surfaces on said pressure plate and the rear wall around the opening for forming a tortuous light path to prevent light which enters said cartridge assembly through the opening from reaching the film.

9. The improvement as defined in claim 8 wherein said pressure plate includes a portion which extends into the opening in the rear wall so as to be engagable by a pressure plate urging member of a camera in which the cartridge assembly is received.

10. The improvement as defined in claim 8 wherein one of said cooperating surfaces forms an annular receses and the other of said cooperating surfaces forms a rib which extends into said recess and surrounds the opening in the rear wall.

[11. In a photographic film cartridge having an exposure window in one wall through which the film is to be pressed against a film seating surface in the camera, and a correspondingly located opening in another wall of the cartridge through which camera structure exerts film seating pressure, the improvement comprising:

a movable pressure plate located in alignment with said opening for transmitting seating pressure to the film, baffle means on said other wall surrounding said opening, and baffle means on said plate and cooperating with the first mentioned baffle means to inhibit light from reaching the film through said opening, while leaving the plate free to move toward and away from the film.]

[12. The improvement set forth in claim 11 in which a portion of said pressure plate extends into said opening.]

*13. In a photographic film cartridge assembly including a disk of photographic film, a casing enclosing the disk and having front and rear opposed walls, the front wall having an exposure window and the rear wall having an opening generally aligned with the exposure window, the disk being rotatable to successively align portions thereof with the exposure window, the improvement comprising*

*a pressure plate located between the rear wall and the disk and substantially overlapping the opening in the rear wall, the pressure plate being movable toward the exposure window in response to a force applied through the opening in the rear wall to press the film disk against a film support surface of a camera,*

*baffle means on said pressure plate and the rear wall for forming a tortuous light path to prevent light which enters said cartridge assembly through the opening from reaching the film, and*

*means for retaining said pressure plate sufficiently adjacent the rear wall that said baffle means prevents light from reaching the film both before insertion of the assembly in a camera and after removal of the assembly from a camera after exposure and full rotation of the disk.*

* * * * *